United States Patent
Cao et al.

(10) Patent No.: US 12,361,282 B2
(45) Date of Patent: Jul. 15, 2025

(54) OPTIMIZING OPERATOR GRANULARITY IN COMPILING AND CONVERTING ARTIFICIAL INTELLIGENCE (AI) MODELS

(71) Applicant: International Business Machines Corporation, Armonk, NY (US)

(72) Inventors: Li Cao, Beijing (CN); Zhan Peng Huo, Beijing (CN); WeiFeng Zhang, Shenzhen (CN); Wei Cui, Beijing (CN); Fei Fei Li, Huang Pu (CN); Ren Jie Feng, Shanghai (CN); Han Su, Shanghai (CN); Zhong Hao Wang, Dalian (CN)

(73) Assignee: International Business Machines Corporation, Armonk, NY (US)

( * ) Notice: Subject to any disclaimer, the term of this patent is extended or adjusted under 35 U.S.C. 154(b) by 1085 days.

(21) Appl. No.: 17/331,888

(22) Filed: May 27, 2021

(65) Prior Publication Data

US 2022/0383095 A1    Dec. 1, 2022

(51) Int. Cl.
*G06N 3/08* (2023.01)
*G06F 8/41* (2018.01)
*G06N 3/044* (2023.01)

(52) U.S. Cl.
CPC .............. *G06N 3/08* (2013.01); *G06F 8/43* (2013.01); *G06F 8/447* (2013.01); *G06F 8/451* (2013.01); *G06N 3/044* (2023.01)

(58) Field of Classification Search
CPC ............ G06F 8/451; G06F 8/447; G06F 8/43; G06N 3/044; G06N 3/08
See application file for complete search history.

(56) References Cited

U.S. PATENT DOCUMENTS

2022/0066544 A1*  3/2022  Kwon ................... G06V 40/23

FOREIGN PATENT DOCUMENTS

| CN | 111880807 A | * | 11/2020 | |
|---|---|---|---|---|
| CN | 112101529 A | * | 12/2020 | ............... G06N 3/04 |
| CN | 115423082 A | * | 12/2022 | |

OTHER PUBLICATIONS

Chen et al., "TVM: End-to-End Optimization Stack for Deep Learning", University of Washington Technical Report, Dec. 1, 2017, 19 pages, <https://www.semanticscholar.org/paper/TVM%3A-End-to-End-Optimization-Stack-for-Deep-Chen-Moreau/ec3071fb918ad69ec80df1ca9cf1fdeb386a9603>.

Lin et al., "ONNC: A Compilation Framework Connecting ONNX to Proprietary Deep Learning Accelerators", Proceedings of the IEEE International Conference on Artificial Intelligence Circuits and Systems (AICAS), Mar. 18-20, 2019, Tiawan, 5 pages, <https://ieeexplore.ieee.org/document/8771510>.

(Continued)

*Primary Examiner* — Phillip H Nguyen
(74) *Attorney, Agent, or Firm* — Edward J. Wixted, III

(57) ABSTRACT

In a method for improving converter and compiler operator granularity, a processor extracts an operator granularity from an artificial intelligence framework and an original model. A processor receives device characteristics from a target device. A processor outputs a converter granularity level to a converter based on the operator granularity and the device characteristics. A processor outputs a compiler granularity level to a compiler based on the operator granularity and the device characteristics.

19 Claims, 7 Drawing Sheets

(56) References Cited

OTHER PUBLICATIONS

Long et al., "FusionStitching: Boosting Execution Efficiency of Memory Intensive Computations for DL Workloads", arXiv, Cornell University, Nov. 24, 2019, 12 pages.
Rotem et al., "Glow: Graph Lowering Compiler Techniques for Neural Networks", arXiv, Cornell University, May 4, 2018, 11 pages, <https://www.researchgate.net/publication/324908454>.
Vasilache et al., "Tensor Comprehensions: Framework-Agnostic High-Performance Machine Learning Abstractions", Facebook AI Research Technical Report, arXiv, Cornell University, Feb. 13, 2018, 40 pages, <https://www.researchgate.net/publication/323164864>.

* cited by examiner

OPTIMIZING OPERATOR GRANULARITY IN COMPILING AND CONVERTING ARTIFICIAL INTELLIGENCE (AI) MODELS

BACKGROUND

The present invention relates generally to the field of artificial intelligence inference, and more particularly to optimizing operator granularities in the converter and compilation process.

Artificial intelligence (AI) primarily takes place using models to construct a representation of a phenomenon. The models are constructed using theoretical principles, prior knowledge and expert judgement. After construction, the models make predictions for results that could happen with the phenomenon under given conditions. Construction systems compare predictions with the actual data and determine how well the model explains the data and hence the phenomenon. The construction systems may reject some models, improve others, and select a "best" model for predicting the phenomenon. Thus, construction is the process by which we compare the models to the data.

Machine learning (ML) inferencing is the process of testing data points on a machine learning algorithm to calculate an output. This process is also referred to as "operationalizing an ML model" or "putting an ML model into production." Machine learning inferencing entails deploying the ML model to make calculations based on the characteristics of the data. The data processing by the ML model is often referred to as "scoring," with the output of the ML model being a score.

SUMMARY

According to one embodiment of the present invention, a computer-implemented method, a computer program product, and a computer system for improving converter and compiler operator granularity are provided. A processor extracts an operator granularity from an artificial intelligence framework and an original model. A processor receives device characteristics from a target device. A processor outputs a converter granularity level to a converter based on the operator granularity and the device characteristics. A processor outputs a compiler granularity level to a compiler based on the operator granularity and the device characteristics.

DETAILED DESCRIPTION

The embodiments disclosed herein provide a dynamic method between compiling operator granularity and inference. An evaluation module reversely guides an operator granularity choice and combination. This guidance may be provided while the model is converted from supported frameworks. The evaluation model also realizes dynamic and adaptive model compiling, and improves inference performance.

Figure 1:
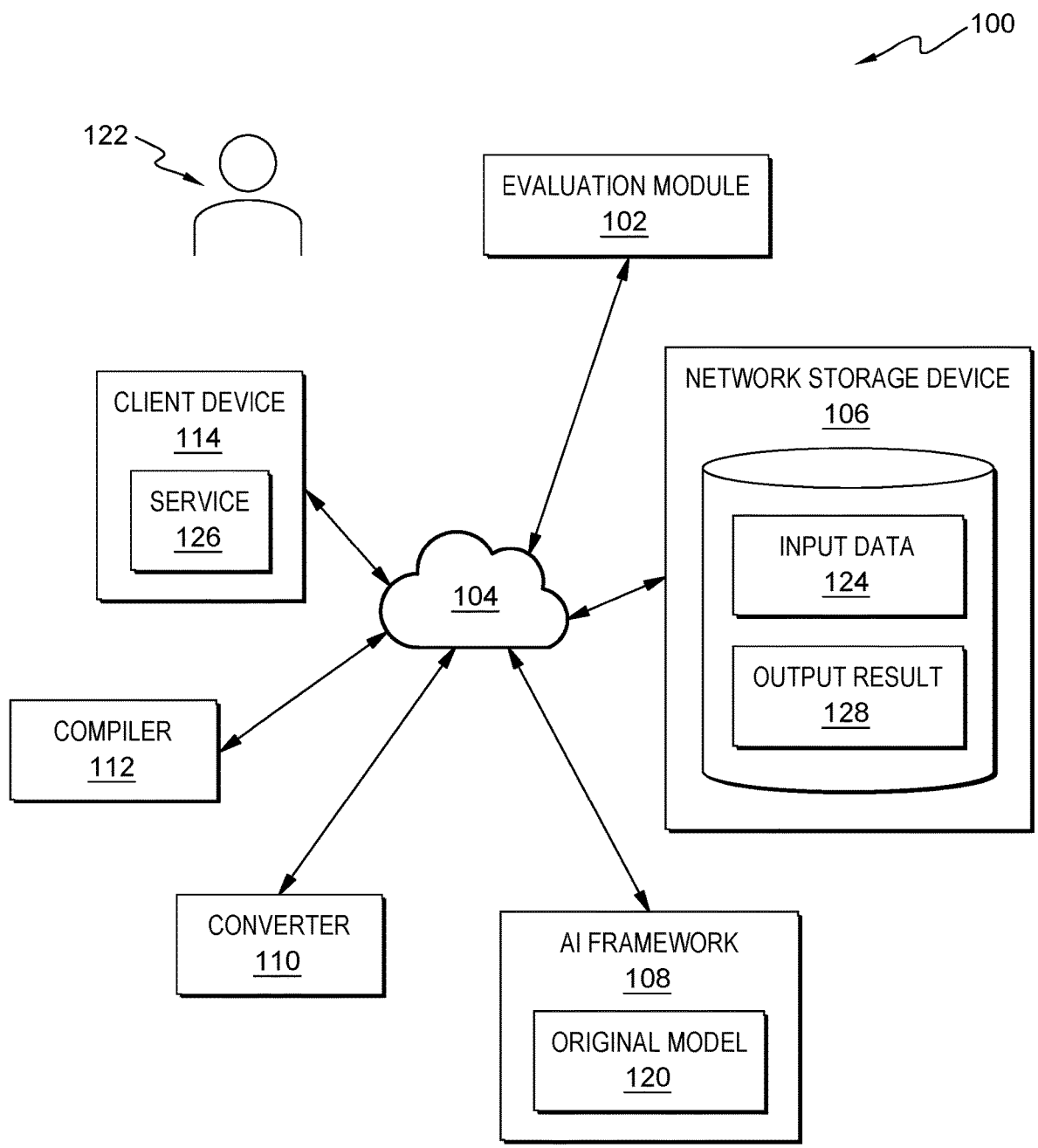
FIG. 1 is a functional block diagram illustrating a searching environment, in accordance with an embodiment of the present invention.

Referring now to the figures, FIG. 1 is a functional block diagram illustrating an artificial intelligence ("AI") inferencing environment 100, according to an embodiment of the present invention. The AI inferencing environment 100 may include an evaluation module 102 for improving the performance of the AI inferencing environment 100. The evaluation module 102 is a device or a program on a device that is communicatively coupled within the AI inferencing environment 100 via a network 104. In some embodiments, the AI inferencing environment 100 may be implemented within a cloud computing environment, or use one or more cloud computing services. Consistent with various embodiments, a cloud computing environment may include a network-based, distributed/data processing system that provides one or more cloud computing services. Further, a cloud computing environment may include many computers, hundreds or thousands, or more, disposed within one or more data centers and configured to share resources over the network 104.

The network 104 is also communicatively coupled to a network storage device 106, an AI framework 108, a converter 110, a compiler 112, and a client device 114. The network 104 may be a local area network (LAN), a wide area network (WAN) such as the Internet, any combination thereof, or any combination of connections and protocols that will support communications between the network storage device 106, the AI framework 108, the converter 110, the compiler 112, and the client device 114 in accordance with embodiments of the invention. The network 104 may include wired, wireless, or fiber optic connections. In certain embodiments, the client device 114, the converter 110, the compiler 112, and the evaluation module 102 may communicate without requiring the network 104, instead communicating via one or more dedicated wire connection or other forms of wired and wireless electronic communication.

Figure 7:
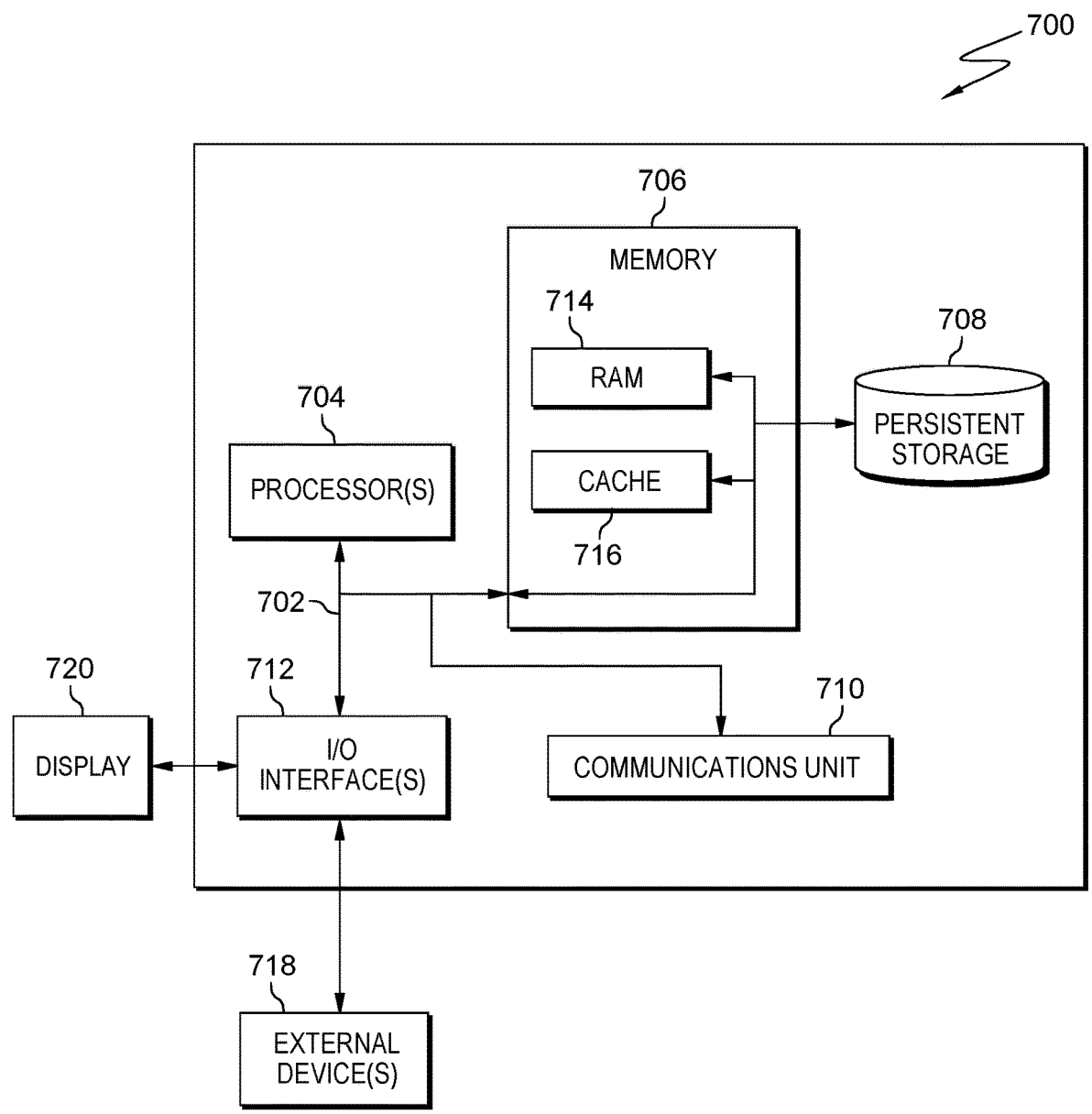
FIG. 7 depicts a block diagram of components of a computing device, in accordance with an illustrative embodiment of the present invention.

In certain embodiments of the AI inferencing environment 100, more or fewer components may be present than illustrated in FIG. 1. For example, the AI inferencing environment 100 may include many additional client devices 114 that communicate with the AI inferencing environment 100 through the network 104. The client devices 114 may include computational components with a wide variety of capabilities, architectures, operating systems, etc. In certain embodiments, some or each of the components (e.g., the AI framework 108, the converter 110, the compiler 112) represent separate computing devices. Each of the disclosed components may be configured the same as or analogous to the computing device 700 as illustrated in FIG. 7. In other embodiments, on the other hand, some or each of the components (e.g., the AI framework 108, the converter 110, the compiler 112) represent particular compute instances of a single computing device (e.g., program modules, computing components within a chassis, a blade server within a blade enclosure, an input/output drawer, a processor chip, etc.). For example, the AI framework 108 may be combined with the network storage device 106 on a single server computing device.

The AI inferencing environment 100 generates an original model 120 based on the AI framework 108. The AI frameworks 108 may include any known AI framework such as Caffe®, TensorFlow®, Torch®, Scikit-Learn®, etc., and the AI inferencing environment 100 may include any number of AI frameworks 108 that produce a variety of original models 120. Since the original model 120 may include a wide range of types and formats, the converter 110 is included to convert the original model 120 to an exchangeable format (e.g., ONNX). The converter 110 may include multiple settings and exchangeable formats, which can affect the cost in time and performance of the conversion process.

The AI inferencing environment 100 inputs the exchangeable format file into the compiler 112 and compiles the original model 120 (i.e., as the exchangeable format file) into an executable/lib for inferencing by the client devices 114. With this inferencing service available, a user 122 can provide input testing data 124 to a service 126 on the client device 114 and get an output result 128. Settings and format selection within the converter 110 and the compiler 112 can influence the speed and accuracy with which the client device 114 inferences the original model 120 (as converted and compiled). Certain embodiments of the AI inferencing environment 100, therefore, involve the evaluation module 102 outputting compiler granularity levels and converter granularity levels to the converter 110 and the compiler 112, respectively.

The evaluation module 102, in certain embodiments, is also a machine learning model. The evaluation module 102 is given datapoints (e.g., granularity levels) and subsequent performance metrics for resulting converter and compiler granularities. The model is then tuned to predict which combination of converter and compiler granularities will give the best performance under a specific combination of granularities. The evaluation module 102 then implements the optimal granularities as determined by the model, as described in detail below.

Figure 2:
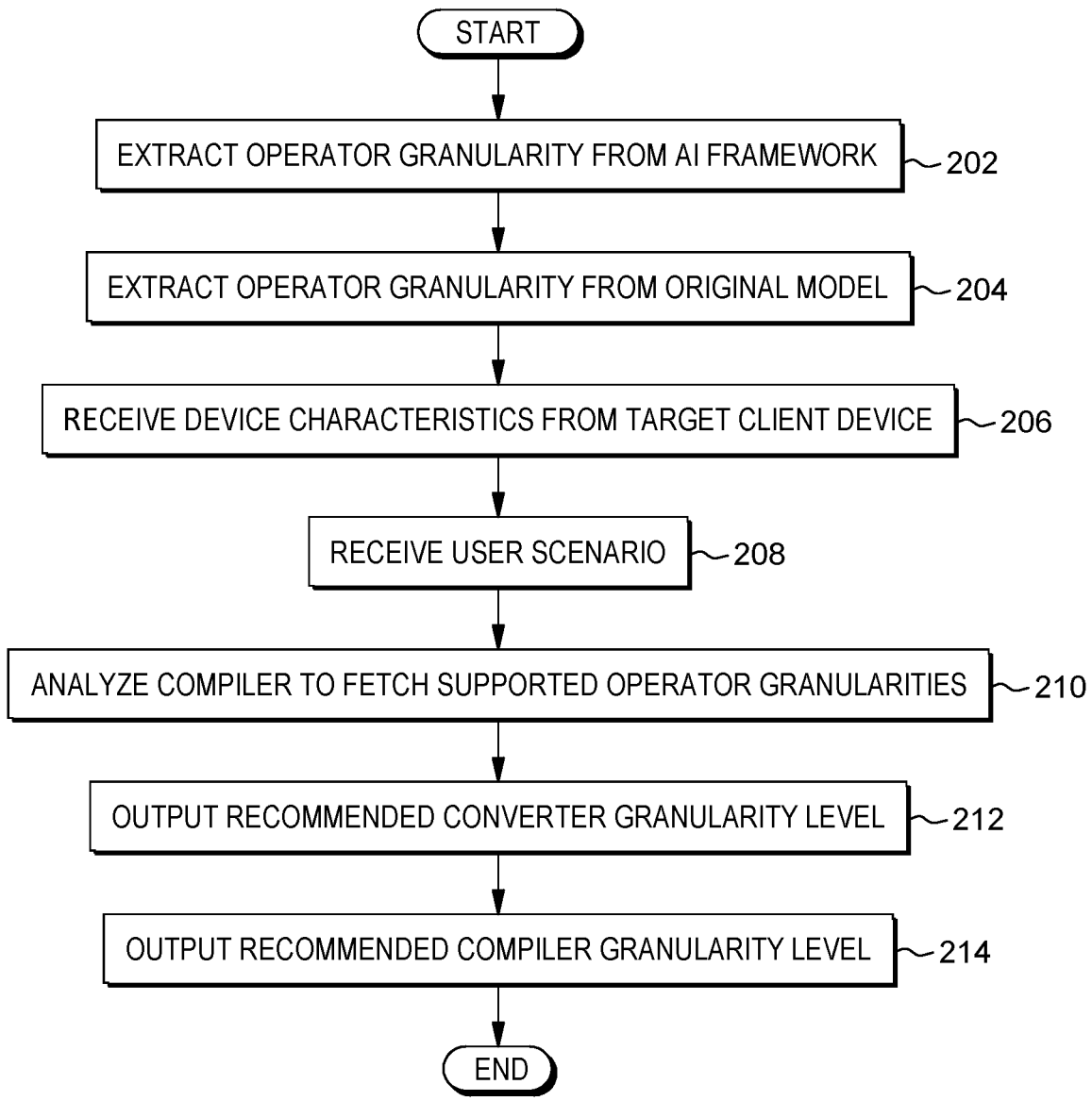
FIG. 2 is a flowchart depicting operational steps of an evaluation module, in accordance with an embodiment of the present invention.

FIG. 2 is a flowchart depicting operational steps of the evaluation module 102, in accordance with an embodiment of the present invention. The evaluation module 102 extracts an operator granularity from the AI framework 108 (block 202). In general, the AI framework 108 is designed with operators that each perform a single task. The number and type of operators is known as operator granularity, and the operator granularity changes depending on the type of AI framework. The function of operator granularity can be an important matter of coding style. Programmers write functions that address one concept, and break up the application into more functions as the complexity of the implementation grows. Eventually, programmers develop an intuition for this practice that is based on their understanding of the tasks they want to accomplish and the programming model.

Some AI frameworks, for example, may include "big" operator granularity. Such frameworks have fewer operators that apply more generally. Other AI frameworks may have "small" operator granularity. Such frameworks have more operators that operate more flexibly to more specific models. Additionally or alternatively, AI frameworks may be adjustable in granularity, for example an AI framework may include certain operators, but not employ them for a given model.

Figure 3:
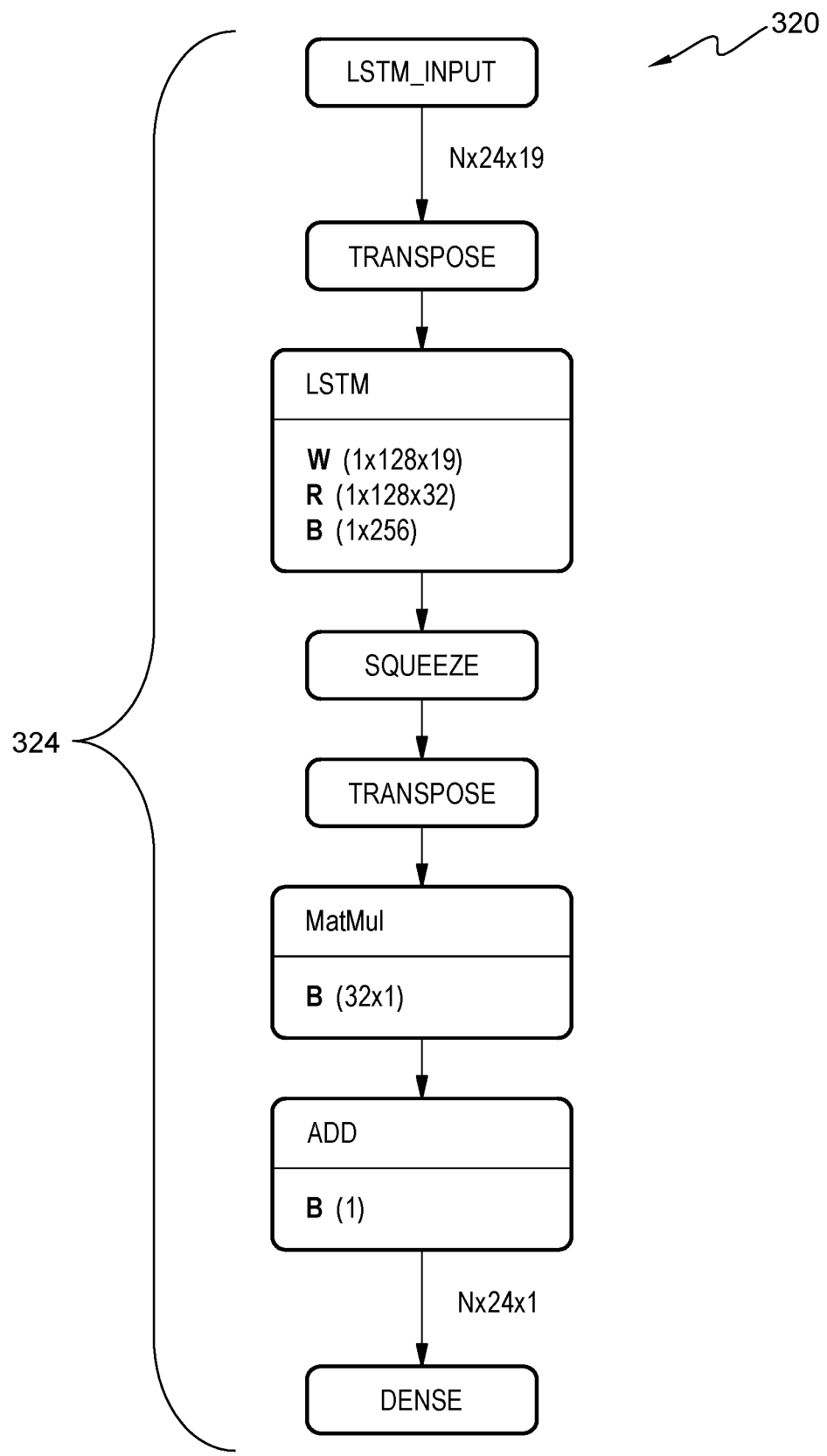
FIG. 3 is a chart that depicts a model that has a big operator granularity, in accordance with one embodiment of the present invention.
Figure 4A:
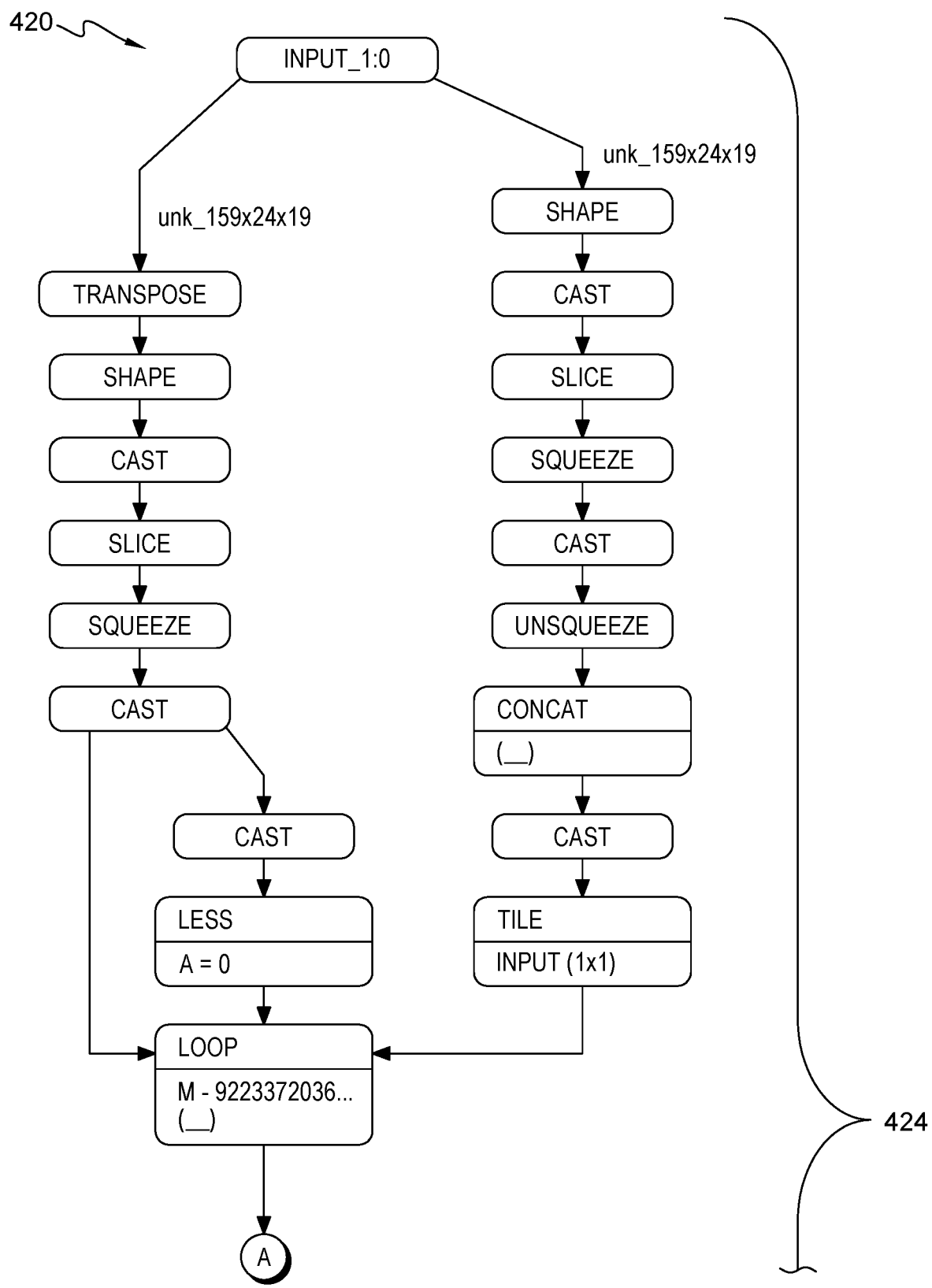
FIGS. 4A-4B include a chart that depicts a model that has a small operator granularity, in accordance with one embodiment of the present invention.
Figure 4B:
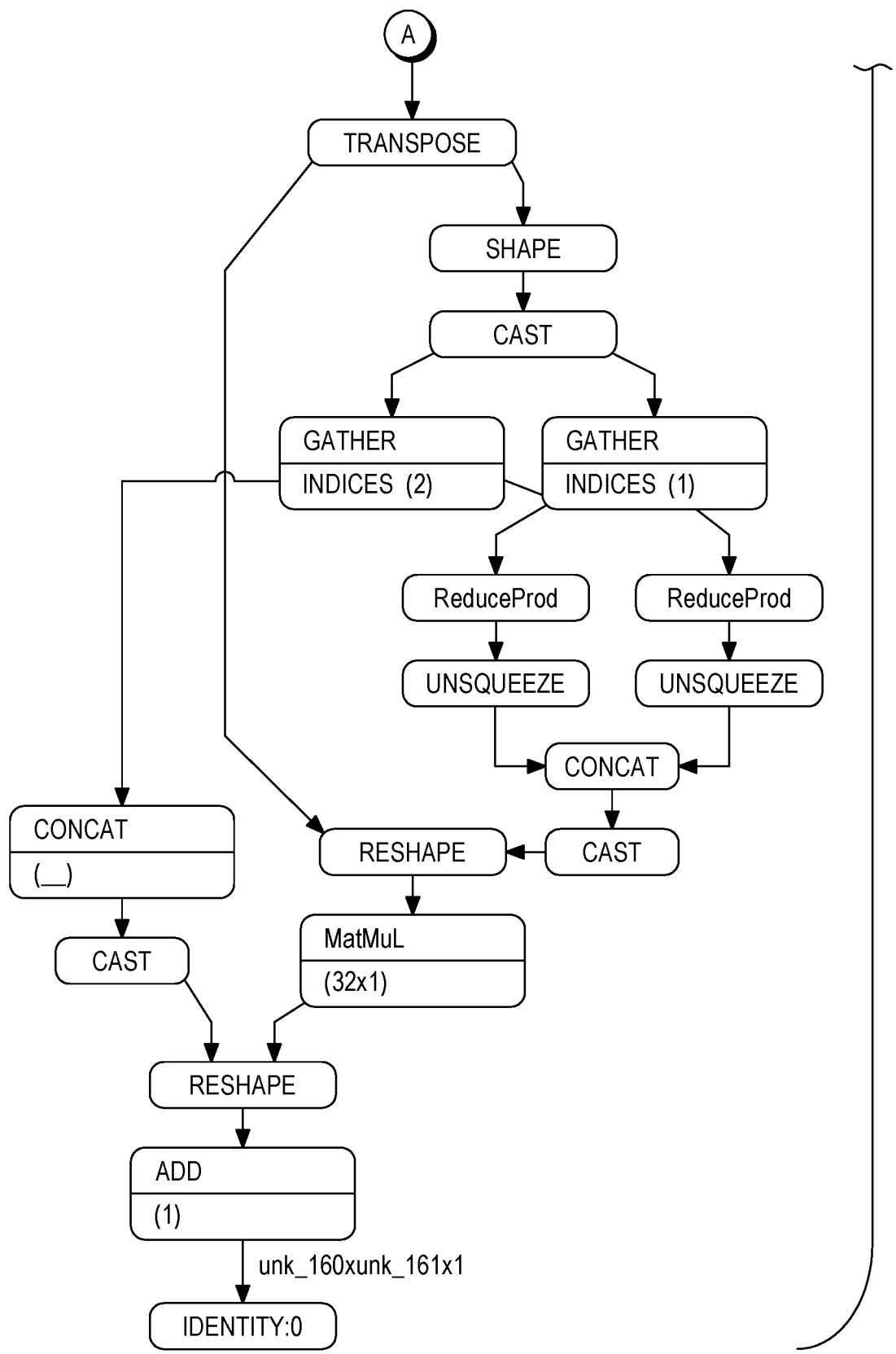

The evaluation module 102 extracts an operator granularity from the original model 120 (block 204). The original model 120 may, similarly to the AI framework 108, have operator granularity that is either big, small, or in between. FIG. 3 is a chart that depicts a model 320 that has a big operator granularity, in accordance with one embodiment of the present invention. The model 320 is an example of a long short-term memory model that has several operators 324 that operate as a recurrent neural network capable of learning order dependence in sequence prediction problems. FIGS. 4A-4B include a chart that depicts a model 420 that has a small operator granularity, in accordance with one embodiment of the present invention. As illustrated, the model 420 has more operators 424 that provide more flexibility in the operation of the model 420. When the big granularity model 320 or the small granularity model 420 are converted and compiled, the granularity affects the operation of the converter 110 and the compiler 112. Thus, the evaluation module 102 extracts the operator granularity from the AI framework 108 (block 202) and the original model 120, 320, 420 (block 204).

Turning back to FIG. 2, the evaluation module 102 receives device characteristics from a target client device 114 (block 206). The device characteristics may include concurrent inference requests to determine how busy the target client device 114 is at a particular time. For example, if the target client device 114 is receiving an elevated number of concurrent inference requests, the evaluation module 102 may seek to reduce the demand on a per-inference request basis, which will be reflected in implemented compiler granularity level and implemented converter granularity level. The device characteristics received by the evaluation module 102 may also include a performance of the target client device 114. That is, target client devices 114 that have faster or more robust hardware components may be given compiler granularity levels and converter granularity levels that reflect the greater capability to perform the inferencing. The device characteristics received by the evaluation module 102 may also include an accelerator or a runtime of the target client device 114. That is, the target client device 114 may include an accelerator or a runtime system that tunes the target client device 114 to be able to more efficiently inference the original model 120, and the evaluation module 102 will reflect this ability in the implemented compiler granularity levels and implemented converter granularity levels. Other device characteristics may also be captured and received by the evaluation module 102.

The evaluation module 102 may also receive a user scenario (block 208). The user scenario may be received from the user 122 inputting the user scenario into the client device 114. The user scenario may include a hardware configuration, a request volume, and a response time. In certain embodiments, the evaluation module 102 may also analyze the compiler 112 to fetch supported operator granularities (block 210). That is, the compiler 112 may have a specific set of operator granularities that are supported, and may not support other operator granularities.

Figure 5:
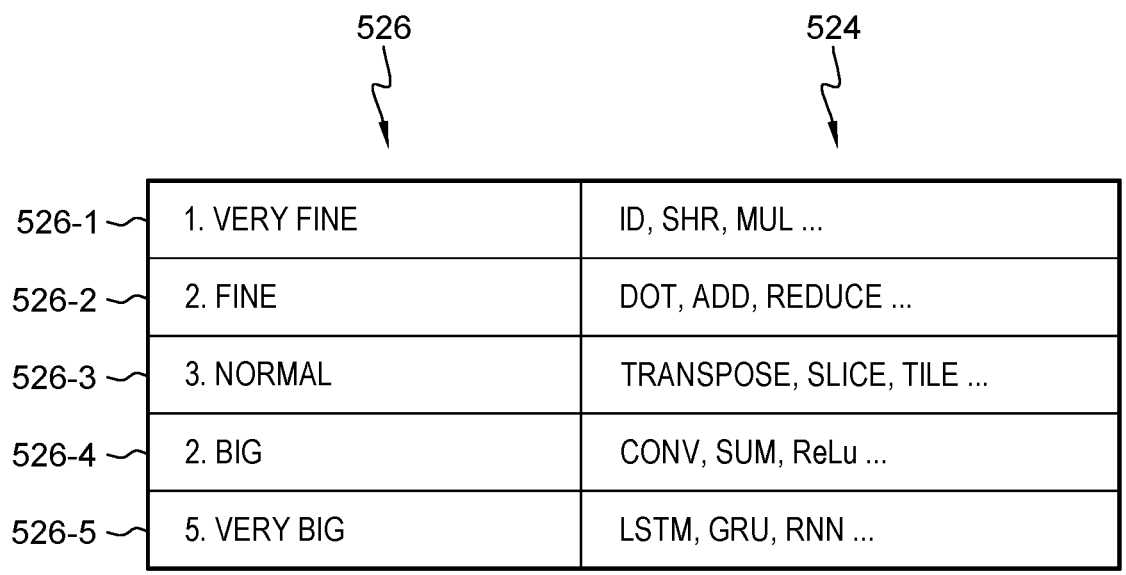
FIG. 5 is a table depicting operators having operator granularity levels, according to one embodiment of the present invention.

FIG. 5 is a table 502 depicting operators 524 having operator granularity levels 526, according to one embodiment of the present invention. The operators 524 and granularity levels 526 illustrated in FIG. 5 are merely exemplary, and other embodiments may have different operators 524, and may associate the operators 524 with different granularity levels 526 without diverging from the invention as disclosed herein. Each of the operators 524 may have the granularity level 526 associated by the evaluation module 102. For example, the evaluation module 102 may associate a "transpose" operator 524, a slice operator 524, or a tile operator 524 with a "Normal" or a "rank 3." granularity level 526-3.

When the evaluation module 102 has extracted or received the granularities/granularity levels for AI inferencing environment 100, the evaluation module 102 then outputs converter granularity levels to the converter 110 (block 212). The converter granularity levels may include specific input operator granularities and output operator granularities. The evaluation module 102 includes a function/algorithm that implements the most optimal operator granularity level for the converter process. The evaluation module 102 uses that function to set the output result of converter process (which is used by the compiler process). The function of the evaluation module 102 may be trained using a decision tree model or other applicable artificial intelligence model technique. Specifically, a decision tree model may be trained using datapoints of optimal converter granularities associated with combinations of: operator granularities from AI frameworks, operator granularity from original models, device characteristics from a target device, or user scenarios.

The evaluation module 102 also outputs compiler granularity levels to the compiler 112 (block 214). The compiler granularity levels may include specific input operator granularities and output operator granularities. The evaluation module 102 includes a function/algorithm that outputs the most optimal operator granularity level for the compiler process. The evaluation module 102 uses that function to set the output result of the compiler process. The function may be trained similarly to the function for the converter process.

In certain embodiments, the outputted compiler granularity level may include operator splitting. Splitting is the process by which one operator is replaced in a model (e.g., original model 120) by multiple operators. For example, the few operators depicted in the model 320 having big operator granularity of FIG. 3 may undergo splitting to become the operators depicted in the model 420 having small operator granularity of FIGS. 4A-4B. The number and type of operators resulting from the splitting process may depend on the recommended compiler granularity level and the characteristics of the compiler 112 used in the AI inferencing environment 100.

In certain embodiments, the recommended compiler granularity level may include a recommendation for operator fusion. Operator fusion is the reverse of operator splitting in the sense that in operator fusion, multiple operators may be replaced with a single operator. For example, the operators depicted in the model 420 having small operator granularity of FIGS. 4A-4B may undergo operator fusion to become the operators depicted in the model 320 having big operator granularity of FIG. 3. Operator fusion may also include stitching, for example fusion stitching by blocks. To prevent the growth of combinatorial options when searching for the optimal solution, the evaluation module 102 may divide the optimization process into two stages: fusion exploration and code generation. The two stages are conceptually independent but related.

In fusion exploration, the evaluation module 102 generates sets of operators for fusion and determines a fusion plan with a highest optimization according to a criteria trained into the evaluation module 102. A fusion plan reveals how operators are grouped together and each group will be eventually mapped to a single hardware-specific implementation. In code generation, the evaluation module 102 generates the implementations for each set of operators produced by fusion exploration. The evaluation module 102 pre-defines the behaviors of each of the operators and enumerates all combinations of the operators with a cost model that estimates the performance of each combination of operators. The evaluation module 102 then selects the best configuration of the fusion pattern and generates the hardware-specific implementation. The selection uses the operator granularity level to guide the operator fusion stitching process.

Figure 6:
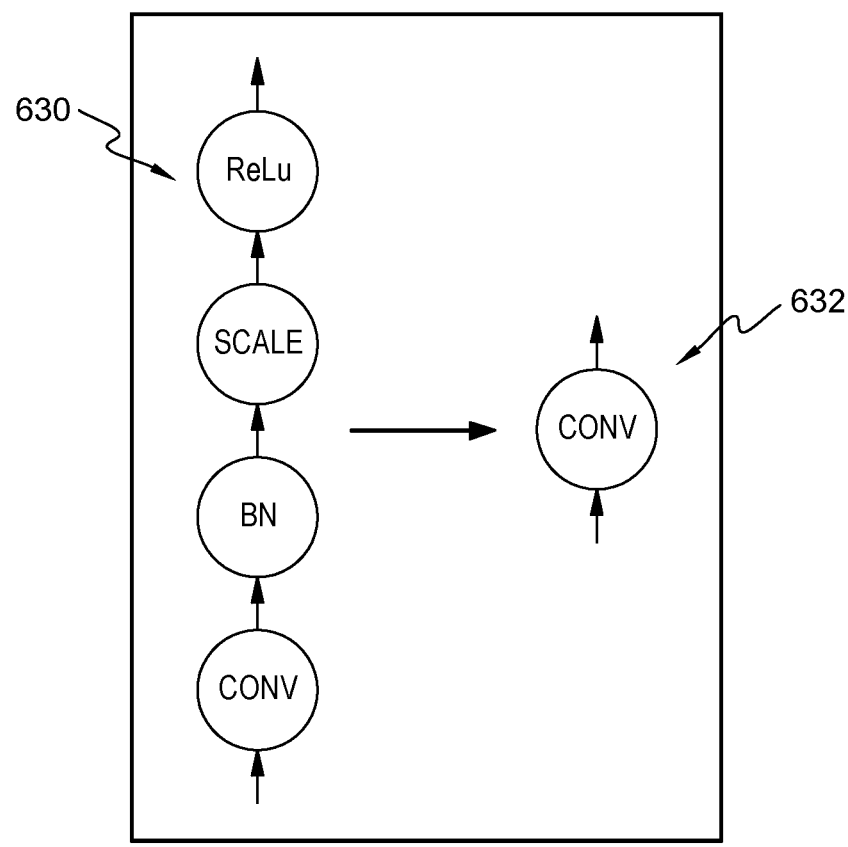
FIG. 6 is a chart depicting original operators undergoing fusion into recommended operators, in accordance with one embodiment of the present invention.

FIG. 6 is a chart depicting original operators 630 undergoing fusion into recommended operators 632, in accordance with one embodiment of the present invention. The original operators 630 include Rectified Linear Unit (ReLU), Scale (an operator used in ONNX), Batch Normalization (Bn), and Convolution (Cony). The operators 630 listed in FIG. 6 are merely examples, and fusion operations may be conceived and completed for any type or types of operators. The evaluation module 102 based on the extracted and received inputs (e.g., operator granularities from AI frameworks, operator granularity from original models, device characteristics from a target device, or user scenarios), recommends that the original operators 630 undergo fusion into a single recommended operator 632: Cony. This fusion may include determining similar mathematical operation steps in the math calculations completed for each operator 630. For example, the Convolution operator 630 has multiplication and addition steps: $x_{i,j}^{l}=\Sigma_m\Sigma_n w_{m,n}^{l} o_{i+m,j+n}^{l-1} b_{i,j}^{l}$. Specifically, there is a weight (w) multiplied by a factor (o); and the product is added to the bias (b). Similarly, the Batch Normalization (Bn) operator 630 has multiply and add operation steps, and the fusion process (i.e., as recommended by the evaluation module 102, and implemented by the compiler 112) will consolidate and optimize these math calculation steps. The fusion and consolidation improves the tensor read/write and tensor multiply/add performance.

FIG. 7 depicts a block diagram of components of a computing device 700 in accordance with an illustrative embodiment of the present invention. The computing device 700 may represent any of the devices (e.g., the network storage device 106, the AI framework 108, the converter 110, the compiler 112, or the client device 114) described above, or a combination of the devices, in the embodiments where the devices are embodied as components of a single computing device. It should be appreciated that FIG. 7 provides only an illustration of one implementation and does not imply any limitations with regard to the environments in which different embodiments may be implemented. Many modifications to the depicted environment may be made.

The computing device 700 includes communications fabric 702, which provides communications between RAM 714, cache 716, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses or a crossbar switch.

Memory 706 and persistent storage 708 are computer readable storage media. In this embodiment, memory 706 includes random access memory (RAM). In general, memory 706 can include any suitable volatile or non-volatile computer readable storage media. Cache 716 is a fast memory that enhances the performance of computer processor(s) 704 by holding recently accessed data, and data near accessed data, from memory 706.

The software components (e.g., the evaluation module 102) may be stored in persistent storage 708 and in memory 706 for execution and/or access by one or more of the respective computer processors 704 via cache 716. In an embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. The proxy, application, access manager, collection page, authentication tool, or multi-factor authentication page may be downloaded to persistent storage 708 through communications unit 710.

I/O interface(s) 712 allows for input and output of data with other devices that may be connected to the computing device 700. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention (e.g., proxy, application, access manager, collection page, authentication tool, or multi-factor authentication page) can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   extracting, by one or more processors, operator granularity from an artificial intelligence framework and an original model;
   receiving, by one or more processors, device characteristics from a target device, the target device for deploying an inferencing service;
   generating, by one or more processors, a converter granularity level to a converter based on the operator granularity and the device characteristics;
   generating, by one or more processors, a compiler granularity level to a compiler based on the operator granularity and the device characteristics; and
   deploying, by one or more processors, the inferencing service on the target device based on the converter granularity level and the compiler granularity level, wherein the inferencing service has a different operator granularity than the original model.

2. The computer-implemented method of claim 1, wherein generating the compiler granularity level comprises a selection from the group consisting of: implementing operator splitting, implementing operator fusion, and implementing operator stitching.

3. The computer-implemented method of claim 2, wherein operator fusion comprises fusion exploration and code generation.

4. The computer-implemented method of claim 1, wherein the original model comprises a long short-term memory model.

5. The computer-implemented method of claim 1, wherein the device characteristics comprise a selection from the group consisting of concurrent inference requests, performance, accelerator, and runtime.

6. The computer-implemented method of claim 1, further comprising:
   receiving, by one or more processors, a user scenario.

7. The computer-implemented method of claim 1, further comprising:
   determining, by one or more processors, supported operator granularities of the compiler.

8. The computer-implemented method of claim 1, further comprising:
   receiving, by one or more processors, a user scenario prior to generating: (i) the compiler granularity level and (ii) the converter granularity level.

9. The computer-implemented method of claim 1, wherein deploying the inferencing service on the target device comprises a selection from the group consisting of: fusing a plurality of operators of the original model into a single operator, and splitting a first operator of the original model.

10. A computer program product comprising:
    one or more computer readable storage media; and
    program instructions stored on the one or more computer readable storage to perform operations comprising:
      extracting operator granularity from an artificial intelligence framework and an original model;
      receiving device characteristics from a target device, the target device for deploying an inferencing service;
      generating a converter granularity level to a converter based on the operator granularity and the device characteristics;
      generating a compiler granularity level to a compiler based on the operator granularity and the device characteristics; and
      deploying the inferencing service on the target device based on the converter granularity level and the compiler granularity level, wherein the inferencing service has a different operator granularity than the original model.

11. The computer program product of claim 10, wherein generating the compiler granularity level comprises a selection from the group consisting of: implementing operator splitting, implementing operator fusion, and implementing operator stitching.

12. The computer program product of claim 11, wherein operator fusion comprises fusion exploration and code generation.

13. The computer program product of claim 10, wherein the original model comprises a long short-term memory model.

14. The computer program product of claim 10, wherein the device characteristics comprise a selection from the group consisting of concurrent inference requests, performance, accelerator, and runtime.

15. The computer program product of claim 10, wherein the operations further comprise:
    receiving a user scenario.

16. The computer program product of claim 10, wherein the operations further comprise:
   receiving a user scenario prior to generating: (i) the compiler granularity level and (ii) the converter granularity level.

17. A computer system comprising:
   a processor set;
   one or more computer readable storage media; and
   program instructions stored on the one or more computer readable storage media to cause the processor set to perform operations comprising:
      extracting an operator granularity from an artificial intelligence framework and an original model;
      receiving device characteristics from a target device, the target device for deploying an inferencing service;
      generating a converter granularity level to a converter based on the operator granularity and the device characteristics;
      generating a compiler granularity level to a compiler based on the operator granularity and the device characteristics; and
      deploying the inferencing service on the target device based on the converter granularity level and the compiler granularity level, wherein the inferencing service has a different operator granularity than the original model.

18. The computer system of claim 17, wherein generating the compiler granularity level comprises a selection from the group consisting of: implementing operator splitting, implementing operator fusion, and implementing operator stitching.

19. The computer system of claim 17, wherein the device characteristics comprise a selection from the group consisting of concurrent inference requests, performance, accelerator, and runtime.

* * * * *